Oct. 29, 1957　　　E. H. HULL ET AL　　　2,811,467
PRELIMINARY COATING FOR COMBUSTION CHAMBER WALL
Filed Jan. 21, 1952

INVENTORS
Edwin H. Hull
Arthur F. Winslow, Deceased
By Elizabeth L. Winslow, Administratrix
ATTORNEYS

United States Patent Office 2,811,467
Patented Oct. 29, 1957

2,811,467

PRELIMINARY COATING FOR COMBUSTION CHAMBER WALL

Edwin H. Hull, Scotia, and Arthur F. Winslow, deceased, late of Schenectady, N. Y., by Elizabeth L. Winslow, administratrix, Schenectady, N. Y.

Application January 21, 1952, Serial No. 267,342

2 Claims. (Cl. 117—62)

This invention relates to combustion apparatus particularly designed for use in aircraft having the rocket type of propulsion. In these aircraft, combustion gases in large volume are continuously discharged from a rearwardly open nozzle and the gases are usually produced by the combustion of liquids at a very high temperature. Designers of such aircraft are faced with the necessity for combustion chamber walls to be made thin in order to save weight, but at the same time these walls must withstand exposure to high temperatures and still retain their structural strength.

Our invention solves this problem by providing a heat insulating coating on the walls and other parts of a combustion chamber that are exposed to the hot gases, which coating is continuously renewable.

It is therefore a general object of our invention to provide an improved combustion chamber structure.

It is a further and more specific object of our invention to provide a continuously renewable heat insulation coating for component parts of an organization that are exposed to hot gases.

Other objects and advantages will appear in the specification which discloses a preferred form of our invention and in which.

Broadly, the heat insulation coating is formed in two steps, one by adding ingredients to the reactants of a motor which form a semi-molten coating on the wall and, two, by introducing the coating forming material to the area to be protected by any of the usual means such as brush painting, forcing it under pressure through holes as a spray, or through porous metal (transpiration) or by any combination thereof. Either step will produce satisfactory heat insulating coatings but the best results are obtained when the steps are combined.

Figure 1:
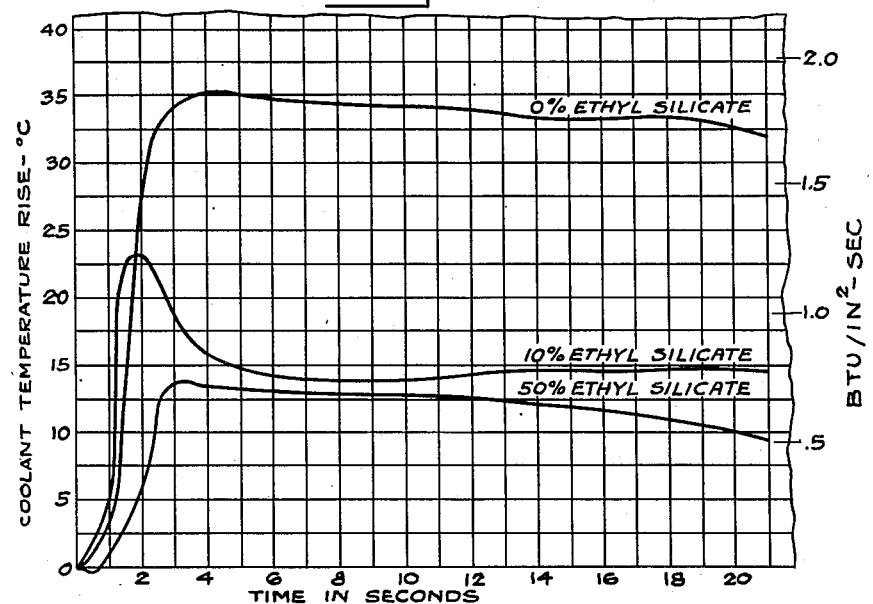
Figure 1 is a curve showing the relation between the temperature rise of a combustion chamber coolant with time for various coating concentrations.

As a specific example of the first step, a reduction in heat transfer rates of 50 to 60 percent has been attained by dissolving ethyl silicate in an alcohol fuel reactant. Figure 1 shows the effect of the additive in reducing heat transfer to the coolant for various concentrations thereof. It will be noted from the curves that a 10 percent concentration of ethyl silicate reduces the temperature rise of the coolant to about 40 percent of the value with no additive. An increase to a 50 percent concentration of ethyl silicate yields a reduction to only about 37 percent of the zero percent additive rise, which indicates that the law of diminishing returns applies approximately at the ten percent value. We use the range of 5–10 percent silicate or its equivalent in silicon content as the standard additive in forming the coating.

Figure 2:
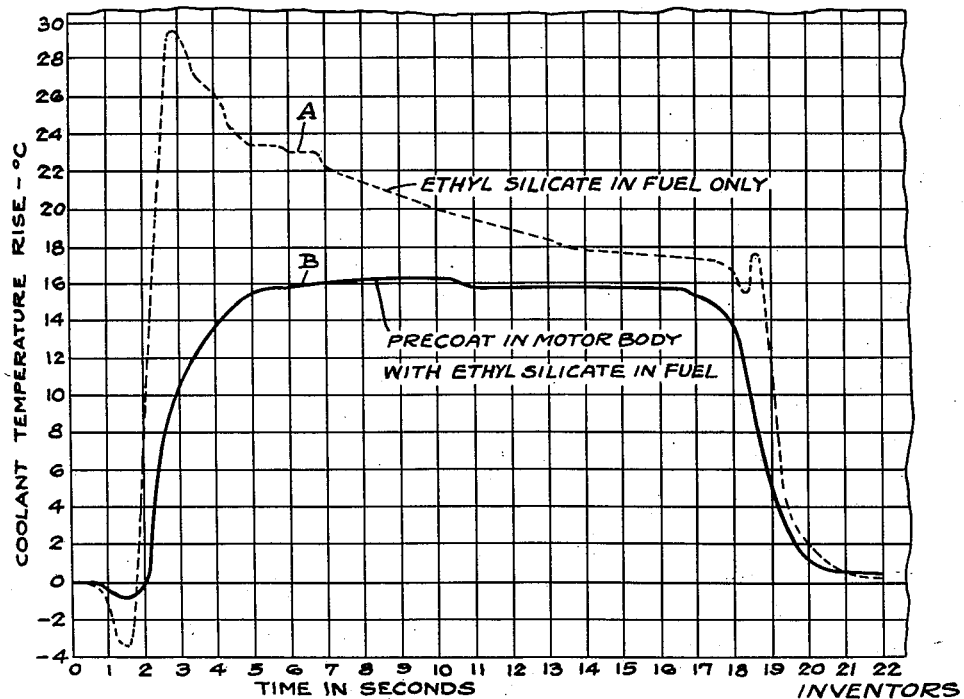
Figure 2 is a curve showing the variation of coolant temperature rise with time for several insulation coating formations.

The ten percent ethyl silicate curve of Figure 1 and curve A of Figure 2 both reveal an initial "hump" wherein the heat transfer rate reduction is considerably less than that in the flat portions of the curve. The reasons for this "hump" are not fully understood but a method of smoothing it out was found which will now be described.

The walls of the chamber exposed to the combustion gas were painted or sprayed with a precoat in accordance with step two, with sodium silicate admixed with various inorganic fillers such as powdered pumice stone, kaolin, powdered asbestos, or stannic oxide. We found that if no ethyl silicate were added to the alcohol fuel reactant the coating disappeared in a short time, but when the ethyl silicate was mixed into the fuel it was noted that the coating tended to flux with the silica deposited by the ethyl silicate to form semi-molten compounds on the rocket motor walls.

It was found that this fluxing effect was increased by adding alkali hydroxides to the painted coatings. It was further established by experimentation that boron compounds such as borax and butyl borate gave similar fluxing effects.

Curve B of Figure 2 shows how a precoated combustion chamber wall when used with silicon in the fuel will smooth out the "hump" in the temperature-time relation.

Typical precoat formulations that have been successfully used are:

|  | Percent | |
|---|---|---|
| Pumice Stone | 38.0 | 29.4 |
| Stannic Oxide | 12.0 | 9.8 |
| Sodium Hydroxide | 2.0 | 2.0 |
| Sodium Silicate | 42.0 | 58.8 |
| Water | 6.0 | 0 |
|  | 100.0 | 100.0 |

The above disclosed process for protection of the parts of a combustion chamber exposed to the combustion gas is equally applicable to the turbine blades of a turbojet and to the vanes of a rocket motor of the type which rises off the ground powered only by the main jet and which requires steering vanes in the jet in order to maintain stability during the low velocity take off before the air rudders can take over control. These rocket jet vanes are usually made of graphite and are subject to breakage due to heat shock and rapid erosion. The heat shock breakage is obviated by applying preliminary insulating coatings and the erosion is prevented or at least greatly alleviated by means of the continuously renewable heat insulating coating.

Having thus described our invention and the advantages thereof we do not wish to be limited to the details herein disclosed otherwise than as set forth in the claims, but what we claim is:

1. The method of insulating component parts of alcohol fuel burning apparatus exposed to high temperature gases which comprises the steps of applying a precoat formation consisting essentially of 38 percent pumice stone, 12 percent stannic oxide, 2 percent sodium hydroxide, 42 percent sodium silicate and 6 percent water, on the said component parts and introducing approximately 10 percent ethyl silicate into the fuel whereby the said ethyl silicate fluxes with the said precoat formation to form semimolten insulating compounds on the said component parts.

2. The method of insulating component parts of alcohol fuel burning apparatus exposed to high temperature gases which comprises the steps of applying a precoat formation consisting essentially of 29.4 percent pumice stone, 9.8 percent stannic oxide, 2.0 percent sodium hydroxide and 58.8 percent sodium silicate on the said component parts and introducing approximately 10 percent ethyl silicate into the fuel whereby the said ethyl silicate fluxes with the said precoat formation to form semimolten insulating compounds on the said component parts.

References Cited in the file of this patent

UNITED STATES PATENTS

| | | |
|---|---|---|
| 2,329,632 | Marsden | Sept. 14, 1943 |
| 2,348,678 | George | May 9, 1944 |
| 2,432,109 | Zisman et al. | Dec. 9, 1947 |
| 2,446,222 | Fletcher et al. | Aug. 3, 1948 |
| 2,529,496 | Hughes et al. | Nov. 14, 1950 |
| 2,563,305 | Britton et al. | Aug. 7, 1951 |

FOREIGN PATENTS

| | | |
|---|---|---|
| 445,506 | Great Britain | Apr. 14, 1936 |

OTHER REFERENCES

Gregory: Uses and Applications of Chemicals and Related Materials, vol. I, Reinhold Pub. Corp., N. Y. (1939), p. 282.